United States Patent
Krishnan et al.

(10) Patent No.: US 6,621,798 B1
(45) Date of Patent: Sep. 16, 2003

(54) METHOD TO SEQUENCE CHANGES FOR IP NETWORK CONFIGURATION

(75) Inventors: P. Krishnan, Matawan, NJ (US); Subrata Mazumdar, Marlboro, NJ (US); Tejas Naik, Eatontown, NJ (US); Ganesan Ramu, Matawan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/418,524

(22) Filed: Oct. 14, 1999

Related U.S. Application Data

(60) Provisional application No. 60/130,374, filed on Apr. 21, 1999.

(51) Int. Cl.⁷ .............................................. H04L 12/28
(52) U.S. Cl. ..................... 370/256; 370/254; 370/255
(58) Field of Search ................................ 370/254, 255, 370/256, 351, 389, 400, 401, 410; 709/200, 201, 213, 232, 238

(56) References Cited

U.S. PATENT DOCUMENTS

| | | | |
|---|---|---|---|
| 5,917,820 A | * 6/1999 | Rekhter | 370/392 |
| 5,926,463 A | * 7/1999 | Ahearn et al. | 370/254 |
| 6,055,561 A | * 4/2000 | Feldman et al. | 709/200 |
| 6,069,889 A | * 5/2000 | Feldman et al. | 370/351 |
| 6,130,889 A | * 10/2000 | Feldman et al. | 370/397 |
| 6,363,319 B1 | * 3/2002 | Hsu | 701/202 |
| 6,415,312 B1 | * 7/2002 | Boivie | 709/200 |

OTHER PUBLICATIONS

Aho et al., "The Design and Analysis of Computer Algorithms," Addison–Wesley Publishing Company, 1974, pp 175–180.

* cited by examiner

*Primary Examiner*—Wellington Chin
*Assistant Examiner*—Jamal A. Fox

(57) ABSTRACT

Updating of routers is achieved by insuring that the scheduling of router updates is such that a zone of turbulence that occurs where the updating takes place does not prevent reaching any router that may be in need of updating. For IP routers that have a task scheduling capability, this is achieved by estimating the time for communicating update information to all routers that need to be updated, adding that estimate to time of day, and transmitting the update specifications. In arrangements where routers do not have a task scheduling capability, updating is sequenced. One embodiment creates a set of traceroute trees that cover the nodes to be updated, and leaf nodes of the trees are taken up at random, placed in an ordered list and deleted from the trees. Another embodiment is more tree centric, in that once a starting node is identified (and its associated tree), all of its nodes are considered before progressing to another tree. A third embodiment takes advantage of the fact that is a node to be updated in not reachable when its updating is to be done, a second try that follows a delay is likely to succeed.

22 Claims, 4 Drawing Sheets

METHOD TO SEQUENCE CHANGES FOR IP NETWORK CONFIGURATION

RELATED APPLICATION

This application claims priority under application number 60/130,374 filed Apr. 21, 1999.

BACKGROUND OF THE INVENTION

This invention relates to IP networks and, more particularly, to techniques for sequencing configuration changes in a network of IP routers.

Current IP networks are typically made up of routers that are interconnected by links. A packet sent to the network reaches a particular destination by specifying the IP address of a destination port. A packet reaches the desired destination port by being routed sequentially through a number of routers.

An OSPF domain of an IP network can be logically divided into a collection of Area Border Routers (ABRs) that are interconnected via "backbone" links, with one or more Areas. Each Area comprises a subnetwork of routers that are interconnected by links. Within an Area there can also be subnets, and each subnet is a collection of interconnected IP routers with a gateway that interfaces the subnet to the rest of the network.

IP routers have numerous parameters that affect their operation. For example, routers can be set to provide a requested level of service, can be set to enhance the security of the communication, can be set to block communication from various sources, can be set to provide management information, etc. Of course, routers need to also carry out their primary mission of routing packets, and to do so routers run a routing protocol. As part of this protocol, each of the routers must develop a sense of the connectivity of the IP network within which it operates, and create a routing table to guide the routing of packets through the router. The routing protocol operates pursuant to various parameters that are associated with the routing protocol. As with the previously mentioned parameters, the routing protocol parameters are configured (e.g., updated) to the routers by one or more system administrators.

To perform the configuring or updating, administrators access routers through either Out-of-band or In-band channels. Out-of-band configuring is accomplished through the console of the router, or remotely through either a modem port of the router or a separate Ethernet port of the router. In-band configuring is accomplished by reaching the router via the network itself, i.e., by "telneting" to the router. In-band configuring is the most common method of access, because it does not require use of a separate access network.

Configuring routers from a central configuring site through the in-band channel presents a potential problem that stems from the fact that updating the parameters of a router can cause another router to be inaccessible. The problem is only a potential problem, because it can occur only when parameters that affect reachability of ports are updated, and only when the updating happens to be done in the wrong sequence. Consequently, it is important to properly sequence to updating of routers to avoid creating a situation where a router needs to be updated from the central site but is inaccessible to the central site.

SUMMARY

Updating of routers is achieved by insuring that the scheduling of router updates is such that a zone of turbulence that occurs where the updating takes place does not prevent reaching any router that may be in need of updating. For IP routers that have a task scheduling capability, this is achieved by estimating the time for communicating update information to all routers that need to be updated, adding that estimate to time of day, and transmitting the update specifications. The routers receive the update specifications, schedule the update task, and independently update themselves at the appropriate time. In arrangements where routers do not have a task scheduling capability, updating is sequenced. Three methods are disclosed. One embodiment creates a set of traceroute trees that cover the nodes to be updated, and leaf nodes of the trees are taken up at random. All leaf nodes that are accounted for are removed from the trees, leaving nodes that were intermediate nodes of other trees. When such nodes become the only remaining leaf nodes, they are removed, and the process continues until no nodes remain in any of the trees. The second embodiment is more tree centric, in that once a starting node is identified (and its associated tree), all of its nodes are considered before progressing to another tree. The third embodiment takes advantage of the fact that if a node to be updated in not reachable when its updating is to be done, a second try that follows a delay is likely to succeed.

DETAILED DESCRIPTION

The problem of sequencing is eliminated if the routers that need to be updated, or configured, provide a "scheduling capability," i.e., an ability to receive configuration updates, store them, and execute the changes at a later time. In accordance with this approach, sets of routers are updated via the method depicted in FIG. 1.

In the first phase, an estimate is obtained in block 10 of the time required to download the configuration information to all of the routers in the set of routers to be updated. This estimate can be gross, such as some large conservative estimate, for example 10 minutes. A more precise estimate can also be obtained, for instance, by performing a ping to the various routers (which gives the reachability time), and using the maximum reachability time, added to the maximum estimated update uploading time. Reachability times (derived with the "pings") can be stored to create a histogram, so that the maximum time that is selected by block 10 is the largest maximum time found in the stored histogram. In accordance with the process depicted in FIG. 1, the estimate of maximum reachability times is added to the time-of-day clock time, and included with the updating information in block 20. Block 30 transmits this information, in-band, to the set of routers to be updated. Lastly, pursuant to block 40, the routers independently update themselves at the appropriate time under control of the previously received and stored instructions.

Figure 1:
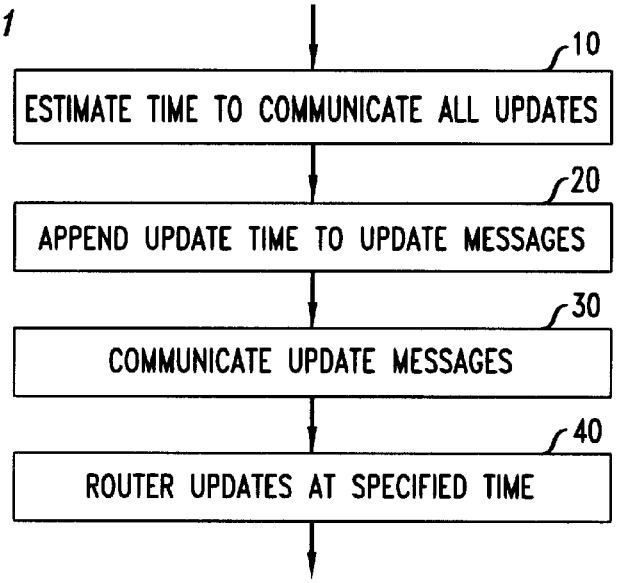
FIG. 1 presents a flowchart of a method for IP routers independently updating their parameters on a scheduled time basis.

The method of FIG. 1 works well, but it requires the routers to have a task scheduling capability. For those networks that employ routers that do not have a task scheduling capability, proper sequencing is the only alternative when using an in-band access channel, or a mixture of out-of-band and in-band access channels.

In most cases, changing a critical routing protocol parameter affects the ability of that router to exchange routing information with other routers. This implies that paths that pass through that router might be unusable, at least for a while. As parameters are changed on several routers, a "zone of turbulence" is created that will settle down when all required routers are updated. The goal is to create the zone of turbulence in such a way that the ability to reach all the required routers is not impaired.

Figure 2:
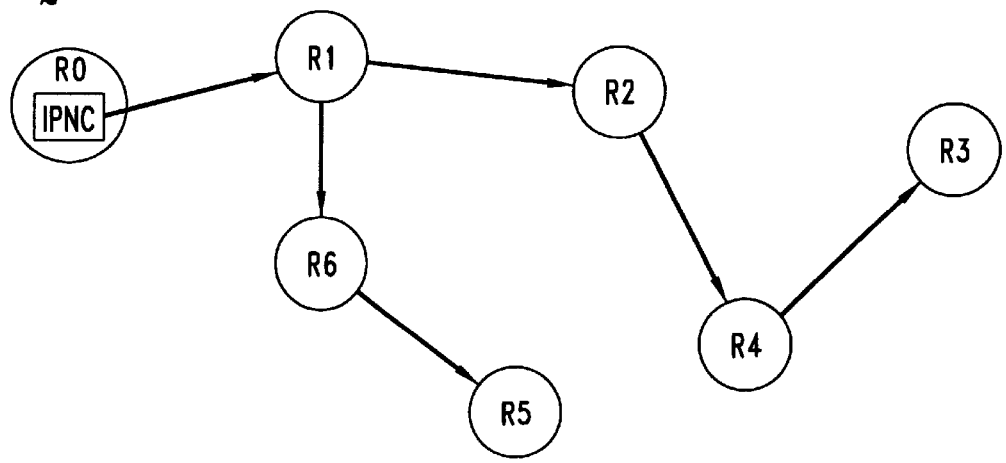
FIG. 2 depicts one directed tree for a network of nodes.

In order to sequence the updating of routers so that the zone of turbulence has the appropriate characteristic, the network's topology needs to be known. This can be accomplished by an IP Network Configurator (IPNC) tool, which may be purchased from Lucent Technologies. Typically, the IPNC tool is installed on a UNIX work station that is coupled to the network. The network's topology is discovered by the IPNC tool. One method of doing this is by executing a set of traceroute commands that cover all of the nodes that need to be updated. The term "cover", as employed herein, means "accounted for". Traceroute is a standard networking tool, included in the Operating System, which takes a destination as its input, and outputs the path taken from the start location to the destination location pursuant to current routing tables. From this information, a directed tree can be constructed that shows how packets are routed from the IPNC tool to the various routers. For convenience, in this disclosure the constructed trees are called "traceroute trees," regardless of whether the information for constructing the trees is obtained by means of a traceroute tool, or otherwise. FIG. 2 depicts a simple traceroute tree of a network, which might have been constructed through a traceroute from the IPNC tool on machine RO to router (i.e., node) R5, followed by traceroutes to nodes R2 and R3. Since a network and the corresponding routing tables can change from time to time, this information is advantageously collected each time an update operation is undertaken, rather than just once. It is assumed that the routing tree is stable for the time required to perform the configurations.

The sequence for updating is specified from the leaves to the root of the tree, so that all nodes that are reachable from a node must appear in the sequencing order before the node. In general, the necessary sequencing order can be obtained using a conventional, depth first, search technique. See, for example, "The Design and Analysis of Computer Algorithms," by Aho, Hopcroft, and Ullman for a description of depth first search. However, the details over and above the basic approach as they relate to an IP network make the sequencing problem interesting and difficult.

In the general case, there may be several possible start nodes for initiating the traceroute. For example, in FIG. 2, the traceroute is accomplished by the IPNC tool logging into machine R1, and executing a number of traceroutes from R1. However, it is possible that the set of routers to be updated cannot be covered from a single machine such as R1. Therefore, it is necessary to have login access to a number of the routers (also termed nodes, or machines) from which traceroute is to be performed, and maybe even to all of the routers. Further, there must be a login path to these traceroute start nodes that does not through other nodes that are to be updated.

The set of routers that do meet the "traceroute start node" requirements (or meet them for subsets of the routers to be updated) includes the following.

The machine on which the IPNC tool is running. Clearly, access to the machine on which the IPNC tool is running is always available.

Routers with out-of-band connection. Also clearly, access to routers with out of band connectivity can be assumed to be always available.

Area border routers (ABRs). For Areas other than the Area of the router in which the IPNC tool resides, or the router to which the IPNC tool is logged in, the ABR is the node that is always reached prior to reaching any other node in the area. Therefore, choosing the ABR as the starting node for the Area is an effective choice.

Gateway routers. Just as with ABRs, the gateway constitutes a good choice as the traceroute start node for the gateway's subnet. It may be noted that, often, the set of nodes that the administrator wishes to update is found in one Area of the network, or in an IP subnet.

Figure 3:
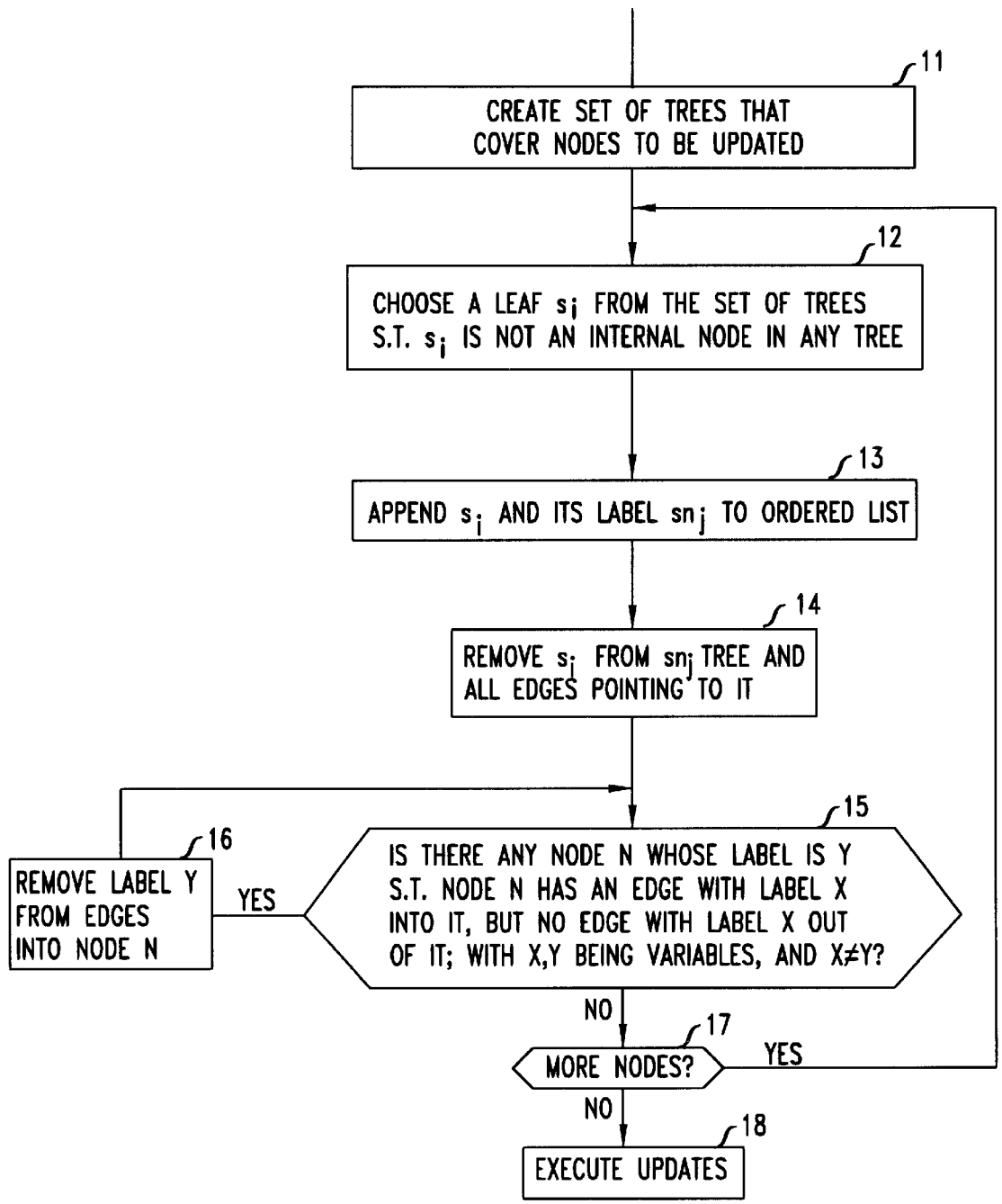
FIG. 3 presents a flowchart of a first method for sequencing the updating of IP routers in a network.

FIG. 3 presents a flow chart of a first real-time sequencing method for updating IP network routers. Basically, the FIG. 3 method creates an ordered list of elements $\{s_i, sn_j\}$, where $s_i$, is a node from a set S of nodes to which update changes need to be made, and $sn_j$ is a node from a set SN of nodes that form "traceroute start" nodes. The updates are executed in the order specified by the ordered list. For the example of the FIG. 2 topology, the ordered list (R3,R0), (R4,R0), (R2,R0), (R5,R0), (R6,R0), (R1,R0) is acceptable.

In the simplest case, a traceroute tree is created from a node $sn_1$, in set SN until all nodes in S are in the traceroute tree, or no new nodes are getting added to the tree. The latter could happen if there is no routing path from $sn_1$, to some of the nodes in S. It may be noted that when a traceroute is performed to a node j, the path may go through several intermediate nodes that are in the set S. Under such (quite common) circumstances, there is obviously no need to execute separate traceroutes to these intermediate nodes. For each executed trace route, each traversed node is labeled with $sn_1$, and so is each traversed link (or "edge"). A node that has already been labeled is not labeled again even if it is traversed with another traceroute. As long as there remain nodes in S that have not been labeled, the traceroute process continues, with a different node in SN, e.g., $sn_2$, serving as the traceroute start node, and any new node or edge that is traversed is labeled with $sn_2$. The resulting structure may look as in FIG. 4 when the traceroute start nodes are R1, and then R7. The result is a set of trees that possibly overlap (e.g. node R6). The set of trees is created by block 11 in FIG. 3.

Once block 11 completes its task, the creation of an update sequence can commence. In accordance with one illustrative embodiment, the sequence is created pursuant to the following pseudo code:

```
While (there are nodes left in any of the set of trees) do {
    Choose a leaf s_i from the set of trees at random such that node s_l is
not an internal node for any tree (OR fail).
    Output leaf s_i, and its label sn_j to the ordered update sequencing
        list
    Remove node s_i from tree sn_j
repeat the following {
    if there is no edge with label x out of a non-leaf node,
    remove label x from all edges into that node (or edges
    with label x into that node) unless the node is labeled x;
    } until (no edge or label is removable);
}
```

Figure 4:
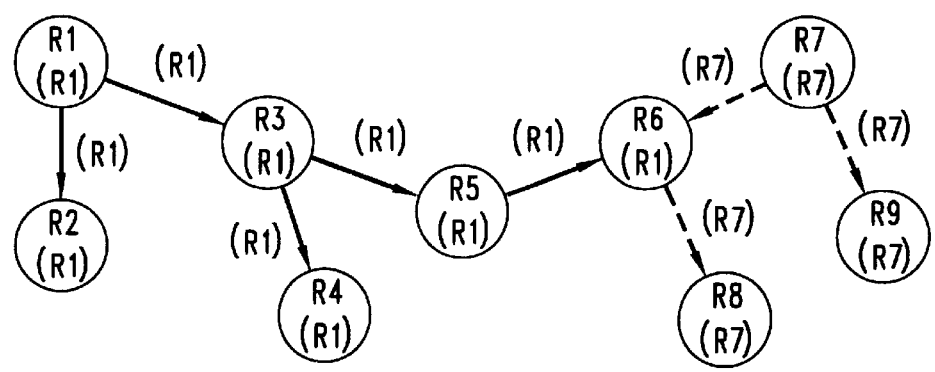
FIG. 4 illustrates the labeling of nodes and links that occurs in the execution of the method disclosed by FIG. 3.

This pseudo code is reflected in FIG. 3 where, once control passes to block 12, a leaf node is chosen arbitrarily from the set of trees such that the node is not an internal node for any tree (OR fail) The chosen leaf node, $s_i$, *and its label,* $sn_j$, which designates the tree to which node $s_i$, primarily belongs, are appended to the ordered list by block 13 as the tuple $\{s_i, sn_j\}$. Block 14 removes the leaf from tree $sn_i$ and all tree $sn_j$, edges that point to the removed $s_i$. Control then passes to block 15, which does a "clean up" operation. In a loop with block 16, block 15 checks for all nodes that have an edge with label x into it but no edge with label x out of it, where label x is different from the label of the node. For all such nodes, the label x on the edges into the node are removed. Control then passes to block 17 which determines whether there are any nodes left. If there are, control returns to block 12. Otherwise, the algorithm terminates with block 18 which sends update execution commands to the routers, in the order specified in the ordered list created in block 13. Of course, there may be nodes in the ordered list that do not need to be updated. The tuples corresponding to those nodes can be removed from the ordered list (or not placed on the list in the first place). In such an embodiment, the process of deleting is carried out either in block 13, "on the fly" so to speak, or in block 18. An example of an acceptable sequence for FIG. 4 is (R2, R1), (R4, R1), (R9, R7), (R8, R7), (R6, R1), (R7, R7), (R5, R1), (R3, R1), R1, R1).

The above described method can be speeded up some by pre-identifying a subset PSN (preferred start nodes) in the set SN. This subset can, of course, contain all nodes in SN but, in practice, it is best to include in the PSN the nodes in SN that can be reached "quickly" from the station that hosts the IPNC tool. Having identified the PSN nodes, trees can be constructed by identifying the nodes that are directly connected to the PSN nodes, as follows:

```
Remove all nodes of PSN from S;
Label each node in PSN with label psn_j
For each node psn_j in PSN do {
    Let n_1, n_2, . . ., n_k be the set of nodes (routers) that have a directly
        connected interface to psn_j;
    For i=1 . . . k {
        If n_i is not already labeled {
            Label n_i with psn_j and add an edge from psn_j to n_i with label psn_j;
            Remove n_i from set S;
        }
    }
}
```

Following this identification and labeling process, the above-described processes for building trees, and developing an update sequence for the trees can proceed for the PSN trees. Thereafter, if there are any nodes left in S, the processes described above can be repeated for those nodes.

The FIG. 3 process focuses on the node-to-be-updated (node-centric). A second method that comports with the principles disclosed herein focuses on the starting node (tree-centric), and is depicted in FIG. 5.

Block 25 creates a set of trees that cover the nodes to be updated. As with block 11, the set might include nodes that do not need to be updated. Assuming that there are $j_{max}$ starting nodes $sn_j$, $j=1, 2, \ldots, j_{max}$, and that there are $m_{max}$ nodes $N_m$, $m=1, 2, \ldots, m_{max}$, that need to be updated, a separate traceroute tree (labeled $sn_j$) is constructed from each starting node $sn_j$. The result may be $j_{max}$ traceroute trees (the routers to be updated might be covered by fewer traceroute trees). Of course, visited nodes are not tracerouted again at the next starting node. An enhancement would be to prune a tree when another start node is reached during traceroute, because the information derived from the tree of that other start node already provides the desired cover.

Following completion of the set of trees, block 25 passes control to block 26 where a start node $sn_j$ is selected, e.g., at random. Having selected the starting node $sn_j$ and its tree, control passes to block 27 where a leaf node $s_a$ is selected from the $sn_j$ tree. Control then passes to block 29, which determines whether the selected $s_a$ node is an intermediate node of another tree. If so, control skips to block 28. Otherwise, control passes to block 31, which outputs the tuple $\{s_a, sn_j\}$ to the ordered list and removes node $s_a$ from the $sn_j$ tree. Control then passes to block 28, which ascertains whether there are more nodes in the tree. When the tree is not empty, control returns to block 26. When the tree is empty, control passes to block 23, which performs the functions described above in connection with FIG. 5. As in connection with the first method disclosed above, the nodes that do not need to be updated are removed from the ordered list, or not placed there in the first place.

Figure 5:
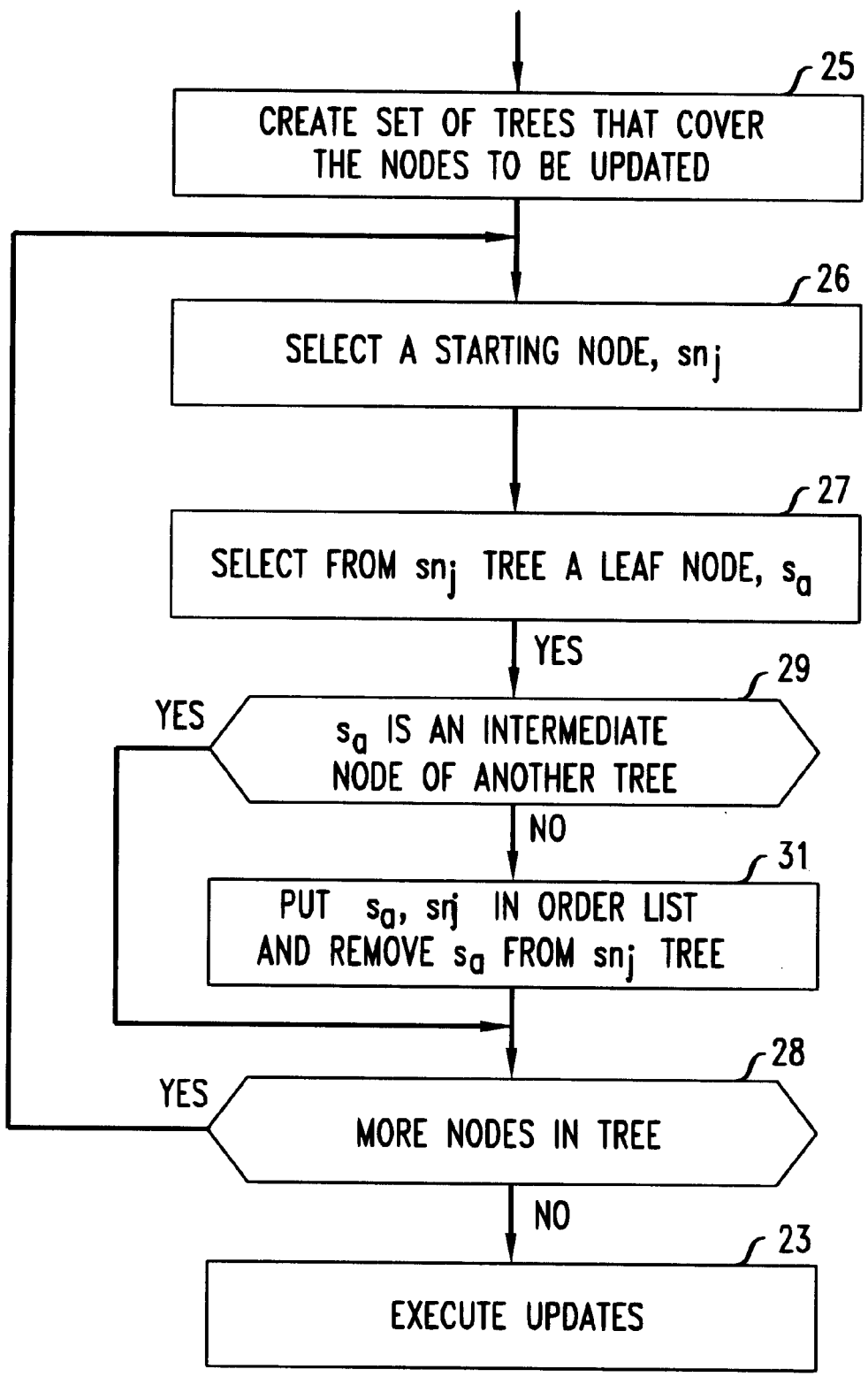
FIG. 5 presents a flowchart of a second method for sequencing the updating of IP routers in a network.

Expressed in pseudo code, the FIG. 5 method follows the logic:

```
While (node exists in any tree) do {
    Pick start node sn_j randomly
    While (leaf node s_i exists in tree sn_j and node s_i is not an intermedi-
        ate
        node of a tree other than sn_j) {
        Put (s_i, sn_j) in update sequencing list
        Remove node s_i from tree sn_j
    }
}
```

The method of FIG. 5 is simple to implement and holds true when, in connection with all nodes, the following holds true: if node A can reach C, node B can reach C and node C can reach D, then nodes A and B can reach D.

Choosing the set of start nodes is an interesting issue. In particular, when making changes to parameters that have an Area-wide impact, the choice of start nodes becomes important. Routers with out of band access are automatically included in the SN set, and in an embodiment that employs the notion of a PSN set may or may not be included in the PSN set (depending on performance issues). If the IPNC tool resides in the same Area as the set of routers being updated, a traceroute from the machine on which the IPNC tool runs is sufficient, and the start node is the machine on which the IPNC tool runs. If the set of routers being updated belong to an Area outside of the area in which the IPNC tool runs, then the SN set (and the PSN set) includes the set of ABRs. If the target lies in a virtual area, then the SN set includes the set of virtual ABRs to the target area.

Of particular practical significance is the case when updates need to be made to routers in a subnet. While the techniques disclosed above are sufficient, one can take advantage of the fact that directly connected interfaces are almost always accessible from a neighbor on the subnet. Since interfaces in a subnet are considered directly connected, the IPNC tool merely needs to reach one of the neighbors, and use that neighbor node as a start node. If an out of band connection is available to one of the subnet nodes, then that is the start node. If not, the following technique can be used:

Perform a traceroute to an arbitrarily chosen existing interface of the subnet

Let r be the first router in the traceroute sequence that has an interface in the subnet. This node will be the gateway node for the subnet.

Set SN={r}, making node r a starting node.

Output: {r1, r}, {r2, r}, . . . , {rN, r}, {r, r}, where r1, r2, . . . , rN are the routers (other than r) that have an interface in the subnet.

If access is available to one of the routers in the subnet, another, more efficient, technique is the following:

Log into a router rr with interface ii in the subnet.

Perform a traceroute from router rr to the IPNC tool host machine M.

Choose the last interface i in the traceroute list (prepended with ii) that belongs to the subnet; let i belong to router r. That, again, will be the gateway of the subnet. (Equivalently, choose the last router r in the traceroute list (prepended with rr) that has an interface i in the subnet). It may be noted that in most cases it is sufficient to examine only the first hop from router rr to determine interface i and router r.)

Set SN={r}, making node r a starting node.

Output: {r1, r}, {r2, r}, . . . , {rN, r}, {r, r}, where r1, r2, . . . , rN are the routers (other than r) that have an interface in the subnet.

In both cases, the elaborate traceroute step from router r can be avoided, since directly connected interfaces can be reached from router r. It may be noted that in both cases, the output r1, r2, . . . r is also valid; i.e., direct telnet to each router, into r at the end of the sequence.

Figure 6:
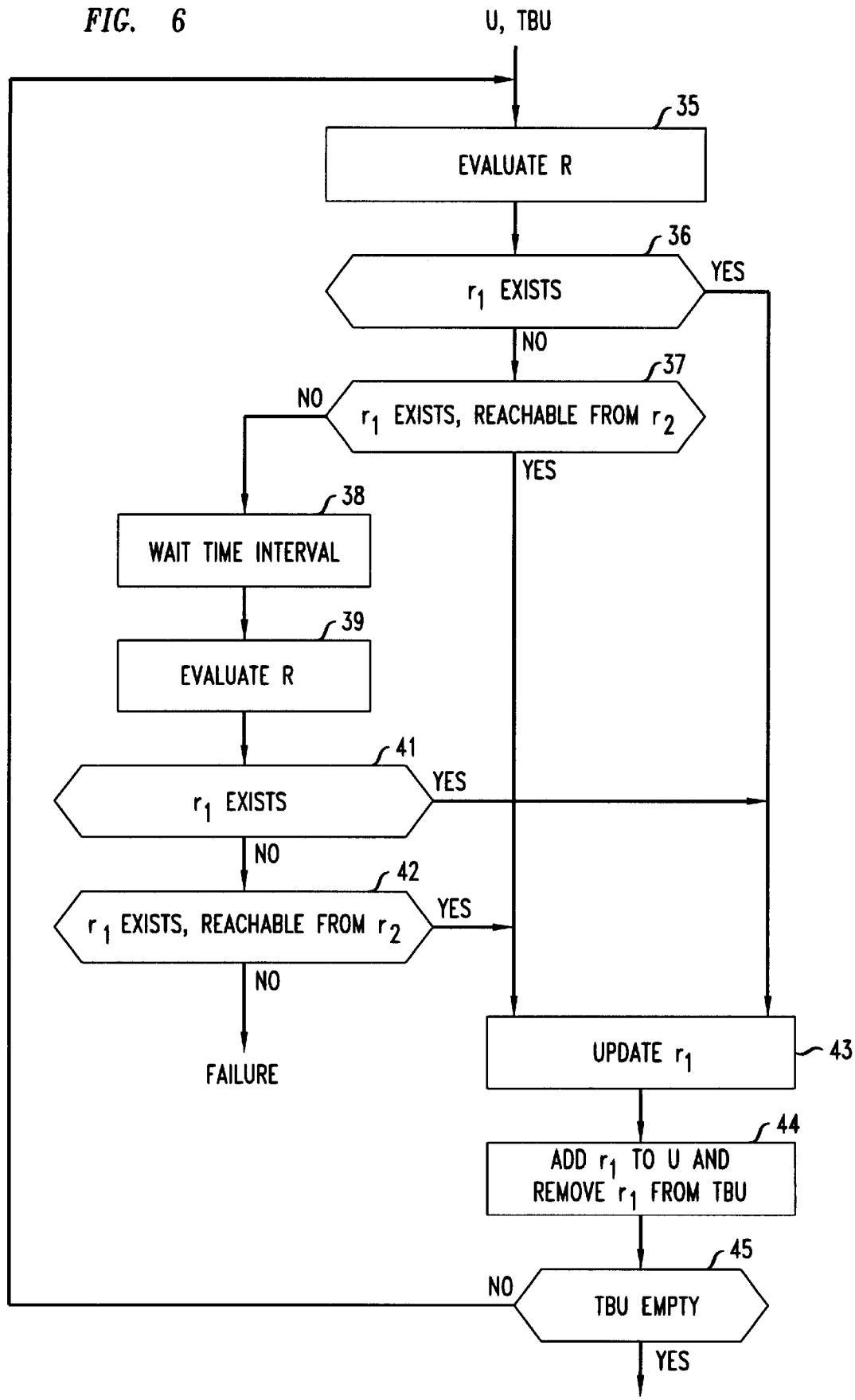
FIG. 6 shows a flowchart of a third method for sequencing the updating of IP routers in a network.

FIG. 6 presents a flow chart of a third real-time sequencing method for updating IP network routers. It, too, sequences through the routers, but does so "on the fly". The method operates on the notion that while immediately after updating a router it may be impossible to reach a particular other router; if a sufficient time is allowed to let the network settle to an updated state, either some router that needs to be updated or a neighbor of some router that needs to be updated can always be reached from the machine that hosts the IPNC tool.

The method maintains a set U, which is the set of updated routes, and a set TBU, which is the set of routers that are scheduled To Be Updated. Initially, the set U is empty, and the set TBU is the set of all routers that need to be updated (S).

Block 35 evaluates the set of routers R that are reachable from the machine that hosts the IPNC tool by checking all routers in the set S for reachability. This can be achieved in a conventional way using the "ping" utility. Block 36 then determines whether there exists a router r1 that also belongs to the TBU set. If so, control passes to block 43. Otherwise, control passes to block 37, which ascertains whether there exists a router r1 in set TBU that can be reached by logging into a router r2 in set R. If so, control again passes to block 43. Otherwise, control passes to block 38 with the assumption that the failure to find a node r1 that satisfies the requirements of blocks 36 and 37 is due to the fact that the IP network is still in an unsettled state from the previous update. Therefore, block 38 imposes a wait period and then passes control to block 39. Block 39 communicates with block 41, and block 41 communicates with block 42. The functions performed by blocks 39, 41, and 42 are identical to the functions performed by blocks 35, 36, and 37, respectively.

Other than outright failures (that should not occur), control from blocks 36, 37, 41, or 42 always passes to block 43. Block 43 receives information about the router r1 and how to reach it. This can be either directly (if block 43 was reached from blocks 36 or 41) or by first logging into router r2 (if block 43 was reached from blocks 37 or 42). Pursuant to this information, the IPNC tool sends the necessary information to router r1 and thereby effects the updating of router r1. Having updated router r1, control passes to block 44, which adds router r1 to set U and removes router r1 from set TBU. Lastly, control passes to block 45, which determines whether the TBU set is empty. If it is not, control returns to block 35. Otherwise, the process terminates.

It can be noted that since blocks 35, 36, and 37 are identical to blocks 39, 41 and 42, respectively, in a software realization of this method these blocks can be implemented with a subroutine, or a function. To illustrate, the following pseudo code implements the method presented in FIG. 6.

```
Main() {
while (TBU is not empty) {
    r1_and_connect_method = GetNextRouterToBeUpdated (U, TBU);
    if (r1_and_connect_method is Fail) {
        wait time T
        r1_and_connect_method = GetNextRouterToBeUpdated (U,
            TBU);
        if (r1_and_connect_method is Fail) {
            exit with FAILURE;
        }
    }
    update r1, connecting as per r1_and_connect_method;
    update U and TBU;
    }
}
GetNextRouterToBeUpdated (U, TBU) {
Determine set R by checking all routers in set S for reachability;
If there is a router r1 in TBU that is also in R {
    return r1; /*direct telnet to r1*/
    }
Else {
    If there is a router r1 that has a directly connected interface I
        to router r2 and r2 is in set R {
        return (r1, r2, I); /*reach interface I of r1 through r*/
        }
    Else {
        return (Fail);
        }
    }
}
```

It should be realized that the above-described embodiments are merely illustrative of our invention, and that various modifications and alternations can be incorporated by persons skilled in the art without departing from the spirit and scope of this invention. For example, the method of FIG. 3 handles all qualified leaf nodes, and sets aside all non-qualified nodes until no leaf nodes remain other that non-qualified nodes (by which time they are all leaf nodes). A modified version of the FIG. 3 method can test each non-qualified node as it is picked up at random to determine whether it is a non-qualified leaf node. If so, the operations of block 17 in FIG. 3 can be carried out immediately. To give another example, in the method disclosed in connection with FIG. 6, instead of imposing an idle wait time in block 38, the process can direct attention to another node that can be reached, effectively employing a wait time that is used to update another, reachable, node. At a later time the unavailable node is selected again and, hopefully, the node has become reachable. If not, another round of cycling through nodes in the TBU set can be taken, or a time delay introduces, or both.

What is claimed is:

1. A method for updating routers in a network, comprising the steps of:

employing one or more traceroute trees, where each tree has a root node, leaf nodes, and edges that connect each leaf node to the root node, through n intermediate nodes, where n is an integer ≧0, where the trees, collectively, cover the routers to be updated, where nodes and edges of each tree are labeled with a tree identifier, and where nodes that belong to more than one tree, when such nodes exist, are labeled with one tree identifier;

updating said routers, starting with leaves of said trees, and proceeding towards the respective roots of the trees.

2. The method of claim 1, carried out with a tool that is resident on a computer that is coupled to said network.

3. The method of claim 2 where said one or more trees have root nodes that are accessible by said computer.

4. The method of claim 2 where said one or more trees have root nodes that are selected from a set comprising said computer, routers which said computer can reach via an out-of-band connection, area border routes, and gateway routers.

5. The method of claim 1 further comprising a step of constructing said one or more trees.

6. The method of claim 5 where said step of constructing said one or more trees selects nodes that are reachable from a computer that carries out said method, at random.

7. The method of claim 5 where said step of constructing said one or more trees selects nodes as root nodes from a preferable subset of nodes that are reachable from a computer that carries out said method, at random.

8. The method of claim 7 where said computer reaches said root nodes by executing a telnet process.

9. The method of claim 1 where said step of employing develops a sequence for updating said nodes to be updates, and said step of updating said routers updates in accordance with said sequence.

10. The method of claim 9 where said sequence is developed in a node-centric manner.

11. The method of claim 9 where said sequence is developed in a tree-centric manner.

12. The method of claim 9 where said sequence is developed by a process that creates an ordered update sequencing list, by executing steps that comport with the logic:

```
While (there are nodes left in any of the set of trees) do {
    Choose a leaf s_i from the set of trees at random such that node s_i is not an internal node for any tree (OR fail).
        Output leaf s_i, and its label sn_j to the ordered update sequencing list
        Remove node s_i from tree sn_j
    repeat the following {
        if there is no edge with label x out of a non-leaf node,
        remove label x from all edges into that node (or edges with label x into that node) unless the node is labeled x;
    } until (no edge or label is removable);
}.
```

13. The method of claim 12 where said process further comprises a step of pruning from said list nodes that do not need to be updated.

14. The method of claim 9 where said sequence is developed by a process that creates an ordered update sequencing list, by executing steps that comport with following the logic:

```
While (node exists in any tree) do {
    Pick start node sn_j randomly
    While (leaf node s_i exists in tree sn_j and node s_i is not an intermediate
    node of a tree other than sn_j) {
        Put (s_i, sn_j) in update sequencing list
```

-continued

```
        Remove node s_i from tree sn_j
    }
}.
```

15. The method of claim 14 where said process further comprises a step of pruning from said list nodes that do not need to be updated.

16. A method for updating routers in a network, comprising the steps of:
   maintaining a set of routers to be updated,
   selecting a router from said set of routers to be updated,
   determining whether said router can be reached from a computer that carries out said method,
   when said step of determining concludes that said router can be reached,
       reaching said router,
       updating said router,
       removing said router from said list of routers to be updated,
       returning to said step of selecting, and
   when said step of determining concludes that said router cannot be reached,
       taking a preselected action that occupies time, and
       returning to said step of determining.

17. The method of claim 16 where said preselected action is a wait period.

18. The method of claim 16 where said preselected action is a wait period of a preselected duration.

19. The method of claim 16 where said preselected action is a direction to select a different router from said set of routers to be updated.

20. A method for updating routers in a network, comprising the steps of:
   selecting a time for communicating update information to each of said routers to be updated,
   based on said step of selecting a time, formulating a time-of-day for updating of said routers to be updated,
   including said time-of-day with updating information that is destined to each of said routers to be updated as an update task scheduling time-of execution specification, and
   transmitting said updating information to said routers to be updated.

21. The method of claim 20 where said selecting a time, selects a duration.

22. The method of claim 20 where said duration is selected by performing ping operations, to determine time that is required to reach each of the routers to be updated.

* * * * *